(12) United States Patent
Sellers et al.

(10) Patent No.: US 7,434,174 B2
(45) Date of Patent: Oct. 7, 2008

(54) METHOD AND SYSTEM FOR ZOOMING IN AND OUT OF PAGINATED CONTENT

(75) Inventors: Timothy D. Sellers, Bellevue, WA (US); Heather L. Grantham, Redmond, WA (US); Joshua A. Dersch, Redmond, WA (US); Jeremy W. J. Newton-Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 11/073,266

(22) Filed: Mar. 4, 2005

(65) Prior Publication Data

US 2006/0197782 A1  Sep. 7, 2006

(51) Int. Cl.
*G06F 3/00* (2006.01)
*G06F 17/00* (2006.01)

(52) U.S. Cl. .................. 715/800; 715/802; 715/765

(58) Field of Classification Search ............ 715/719, 715/720, 722, 760, 764, 765, 779, 781, 810, 715/835, 846, 856, 501.1, 205
See application file for complete search history.

(56) References Cited

U.S. PATENT DOCUMENTS

| | | | |
|---|---|---|---|
| 2003/0115167 A1* | 6/2003 | Sharif et al. | 707/1 |
| 2004/0111332 A1* | 6/2004 | Baar et al. | 705/26 |
| 2004/0125138 A1* | 7/2004 | Jetha et al. | 345/764 |
| 2005/0041046 A1* | 2/2005 | Baar et al. | 345/661 |
| 2005/0198571 A1* | 9/2005 | Kramer et al. | 715/517 |
| 2006/0192780 A1* | 8/2006 | Lantin | 345/427 |
| 2007/0130540 A1* | 6/2007 | Doyle et al. | 715/801 |

* cited by examiner

*Primary Examiner*—X. L Bautista
(74) *Attorney, Agent, or Firm*—Workman Nydegger (57) ABSTRACT

A method and system for changing the zoom applied to a document. A request is received to change the zoom of a document displayed in a viewing area. A focal point is determined based on whether an insertion point or active selection is currently displayed in the viewing area. Then, the viewable area of the document is displayed in the viewing area based on the focal point and the zoom change.

20 Claims, 7 Drawing Sheets

METHOD AND SYSTEM FOR ZOOMING IN AND OUT OF PAGINATED CONTENT

FIELD OF THE INVENTION

The invention relates generally to computers, and more particularly to displaying information.

BACKGROUND

Computer displays are quickly becoming a viable viewing source for many types of activities. One such activity is the viewing of documents. A computer can allow great flexibility in viewing a document including jumping to hyperlinked locations in the document, zooming in and out, allowing a user to jump to a page by indicating a desired page number, and a host of other document viewing options. When zooming in and out in viewing a document, a user may become frustrated or confused by the behavior of current document viewing implementations.

What is needed is an improved method and system for zooming in and out of paginated content.

SUMMARY

Briefly, the present invention provides a method and system for changing the zoom applied to a document. A request is received to change the zoom of a document displayed in a viewing area. A focal point is determined based on whether an insertion point or active selection is currently displayed in the viewing area. Then, the viewable area of the document is displayed in the viewing area based on the focal point and the zoom change.

In one aspect, a user making zoom changes is provided with a better and more consistent experience when viewing the document.

In another aspect, dead space in the viewing area is minimized or reduced during zooming.

Other aspects will become apparent from the following detailed description when taken in conjunction with the drawings, in which:

DETAILED DESCRIPTION

Exemplary Operating Environment

Figure 1:
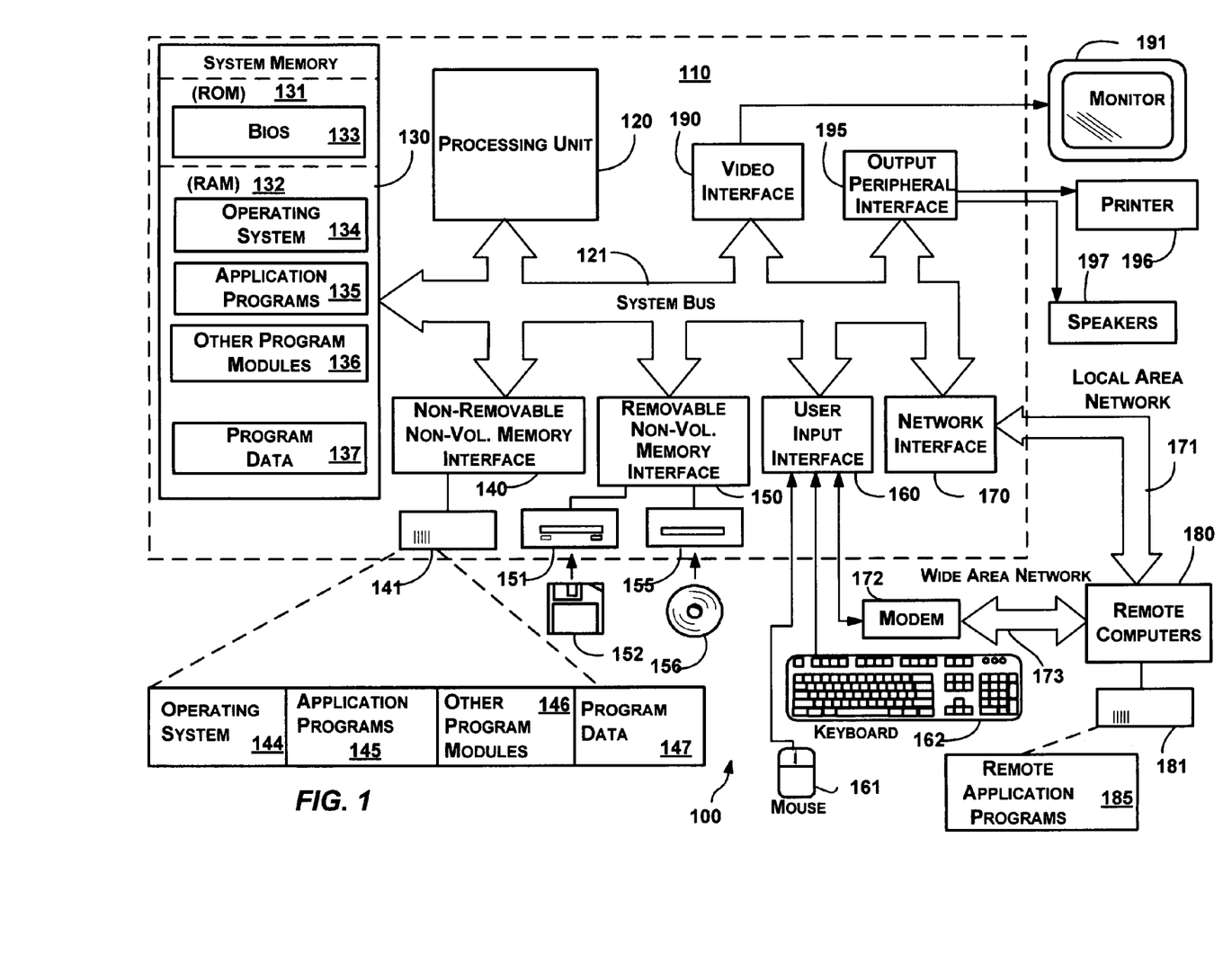
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Zooming into Paginated Content

Figure 2:
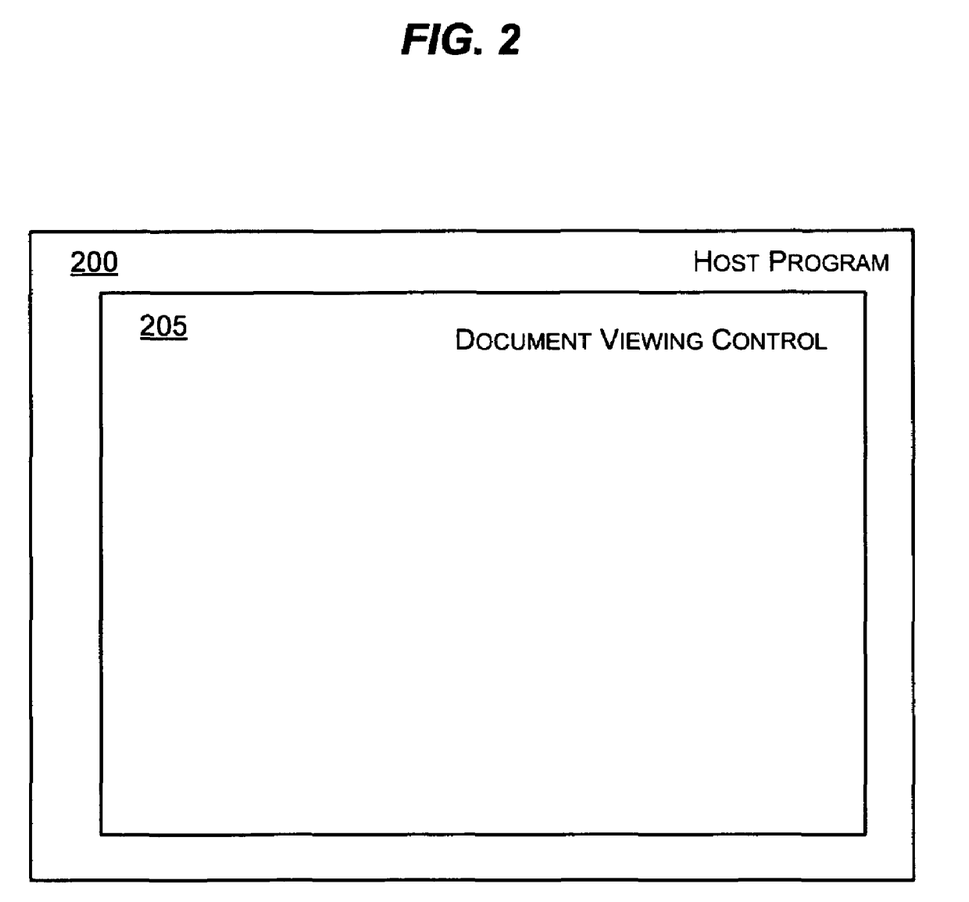
FIG. 2 is a block diagram representing an exemplary configuration in which the present invention may operate in accordance with various aspects of the invention.

FIG. 2 is a block diagram representing an exemplary configuration in which the present invention may operate in accordance with various aspects of the invention. The configuration includes a host (e.g., application) program 200 and a document viewing control 205. The host program 200 comprises a computer program that executes on a computer, such as the computer system 110 of FIG. 1, and may comprise a conventional application program, an operating system component or utility, another control, and so forth. The document viewing control 205 comprises an object that may include other objects (e.g., controls) to perform certain functionality. When executed, the document viewing control provides a viewing area with which to view documents and may also display one or more toolbar items for accessing and modifying the way the document is viewed. For example, a user may zoom in and out by clicking on the appropriate toolbar item, may select a desired zoom percentage from a dropdown list or directly type in a desired zoom percentage value, and may find, copy, or print text in the document by selecting the appropriate toolbar item. As used herein, a document may include text, graphics, or any combination thereof.

The document viewing control may expose several properties and commands. Below is a definition of some exemplary properties and commands that may be exposed by the document viewing control 205.

```
namespace System.Windows.Controls
{
   public class DocumentViewer : Control, IServiceProvider,
IAutomationPatternProvider, IAddChild, IEnsureVisible
   {
     //Public Properties
     //Page layout & display controls
     public int                          PageCount { get; }
     public int                          FirstVisiblePage { get; set; }
     public int                          LastVisiblePage { get; }
     public double                       HorizontalOffset { get; set; }
     public double                       VerticalOffset { get; set; }
     public double                       ExtentWidth { get; }
     public double                       ExtentHeight { get; }
     public double                       ViewportWidth { get; }
     public double                       ViewportHeight { get; }
     public bool                         ShowPageBorders { get; set; }
     public DocumentLayout               DocumentLayout { get; set; }
     public double                       ZoomPercentage { get; set; }
     public int                          GridColumnCount { get; set; }
     public double                       VerticalPageSpacing { get; set; }
     public double                       HorizontalPageSpacing { get; set; }
     //The document content
     public IDocumentPaginator           Content { get; set; }
     //Useful flags (for Styling purposes)
     public bool                         IsAtStart { get; }
     public bool                         IsAtEnd { get; }
     public bool                         CanZoomIn { get; }
     public bool                         CanZoomOut { get; }
     public bool                         IsToolbarMaximized { get; set; }
     //Attached Dependency Property for Styling requirements
     public DependencyProperty           ContentHostProperty;
//Public Commands exposed by DocumentViewer (i.e. not in CommandLibrary)
     //Toolbar
     public Command                      ToggleToolbar;
     //Layout related
     public Command                      ReflowDocument;
     public Command                      ViewThumbnails;
     public Command                      ViewFitToWidth;
     public Command                      ViewFitToHeight;
   }
}
namespace System.Windows.Documents
{
    //Document Layout specification
    public struct DocumentLayout
    {
       //Constructor assuming Value = 1.0 and Text=" "
       public DocumentLayout(DocumentLayoutType type);
       //Constructor assuming Default Text=" ".
       public DocumentLayout(DocumentLayoutType type, double value);
       //Constructor assuming nothing.
       public DocumentLayout(DocumentLayoutType type, double value,
string text);
       public DocumentLayoutType DocumentLayoutType { get; set; }
       public double Value { get; set; }
       public string Text { get; set; }
    }
    public enum DocumentLayoutType
    {
      Zoom,
      FitToWidth,
      FitToHeight,
      ThumbnailView,
      GridColumnCount
    }
}
```

The properties and commands of the document viewing control 205 may be accessed by the application 200. Properties that indicate "get" are readable. Properties that indicate "set" are writable. Properties that indicate "get" and "set" are both readable and writable. It will be readily recognized that other properties and commands may be included and/or that some of the properties and commands above may be deleted or modified without departing from the spirit or scope of the present invention. Furthermore, the above-described properties and commands are exemplary, and it will be readily recognized that other data structures, definitions, techniques, and methods may be used to implement various aspects of the document viewing control 205 without departing from the spirit or scope of the present invention.

Figure 3:
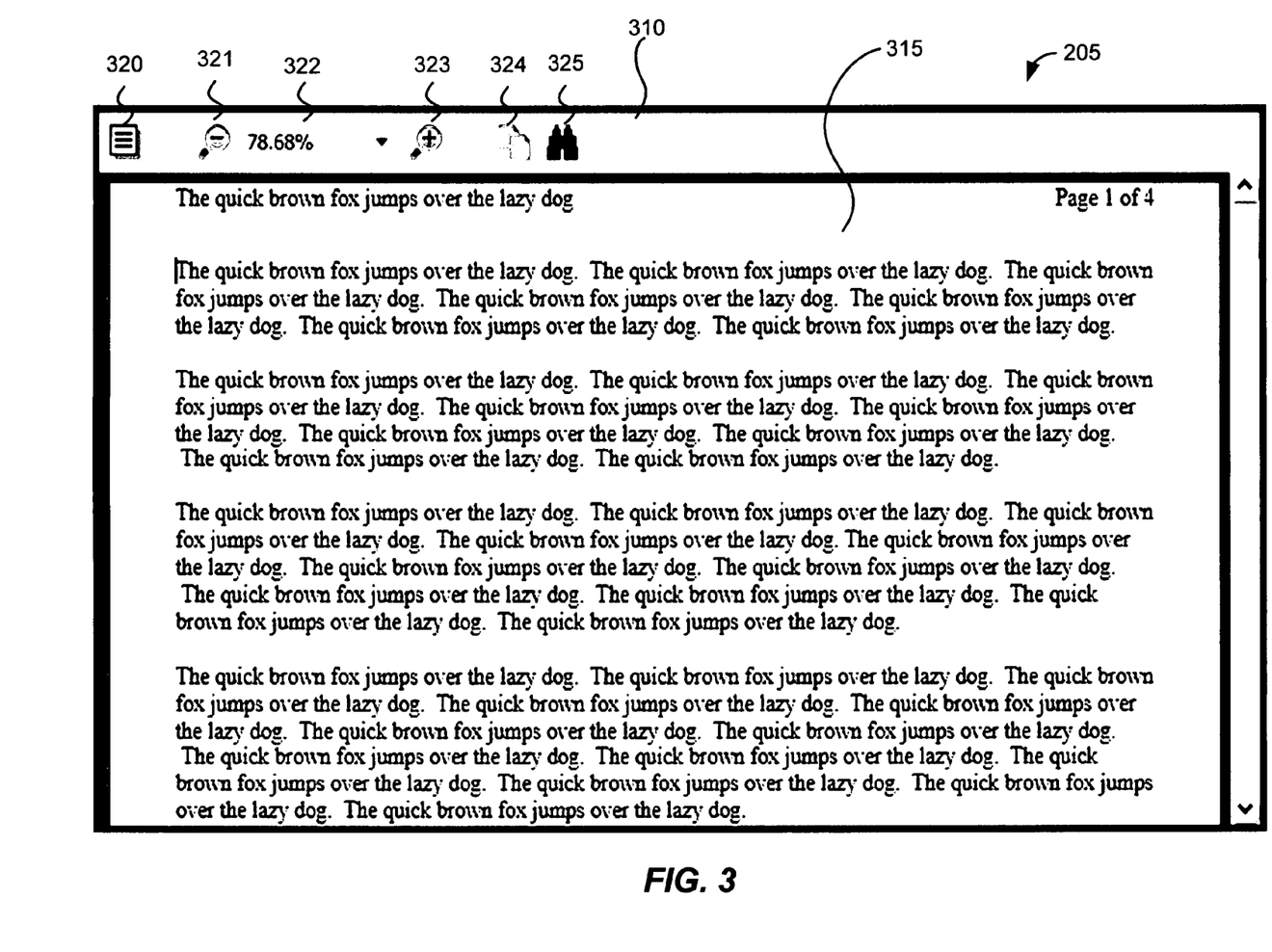
FIG. 3 is a screen shot illustrating one exemplary view of a document viewing control in operation in accordance with various aspects of the invention.

FIG. 3 is a screen shot illustrating one exemplary view of a document viewing control in operation in accordance with various aspects of the invention. In this view, the document viewing control 205 comprises a toolbar 310 and a viewing area 315. The toolbar 310 may include one or more toolbar items 321-325. Exemplary toolbar items include menu button 320, zoom-in button 321, zoom combobox 322, zoom-out button 323, copy button 324, find button 325, and print button (not shown). The document viewing control 205 may provide an interface that allows additional toolbar items to be added and that allows any existing or added toolbar items to be removed, hidden, enabled, or disabled.

Of particular interest, zoom-in button 321, zoom combobox 322, and zoom-out button 323 provide a mechanism for changing the zoom percentage (hereinafter "zoom") applied to a document in the viewing area 315. By selecting zoom-in button 321, a user may decrease the zoom applied to a document. By selecting the zoom-out button 323, a user may increase the zoom applied to a document. The zoom combobox 322 may include various predefined "Zoom Stops" and other zoom-related settings (e.g., "100%", "50%", "1 Page" and the like) and may also allow a user to type in a zoom for changing the zoom applied to a document.

Ideally, the document viewing control 205 includes most or all the functionality for displaying a document based on selections to the toolbar items. For example, if the zoom-out button 323 is selected, the document viewing control 205 may zoom the document in the view area 315 as appropriate without additional instruction by the application hosting the document viewing control 205.

Figure 4:
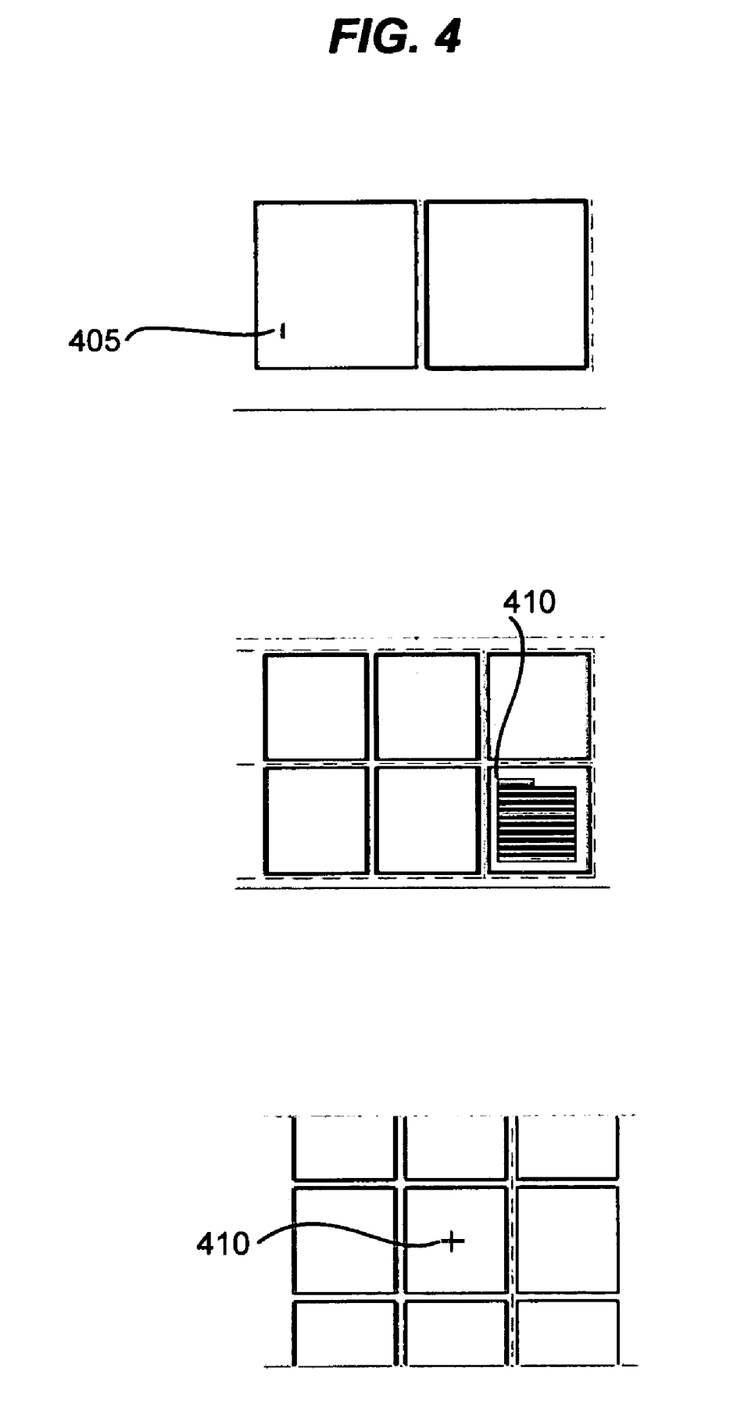
FIG. 4 illustrates several exemplary views of a viewing area of a document viewing control in accordance with various aspects of the invention.

FIG. 4 illustrates several exemplary views of a viewing area of a document viewing control in accordance with various aspects of the invention. When zooming in and out of a document, the focal point of the zoom may be set to the insertion point (IP) 405, the beginning of the active selection 410, or the center of the viewing area. When the IP 405 is visible in the viewing area, the IP 405 is used as the focal point for zooming. When any part of the active selection 410 is visible in the viewing area, the beginning of the active selection 410 is used as the focal point.

In some senses, for zooming purposes, the IP may be considered and treated as an active selection of zero length starting at the IP. When there is no active selection or IP visible in the viewing area, the center of the viewing area may be used as the focal point. It will be recognized that other locations may also be used as the focal point, including the center, top, bottom, end, or left or right side of an active selection, for example, without departing from the spirit or scope of the present invention.

Figure 5:
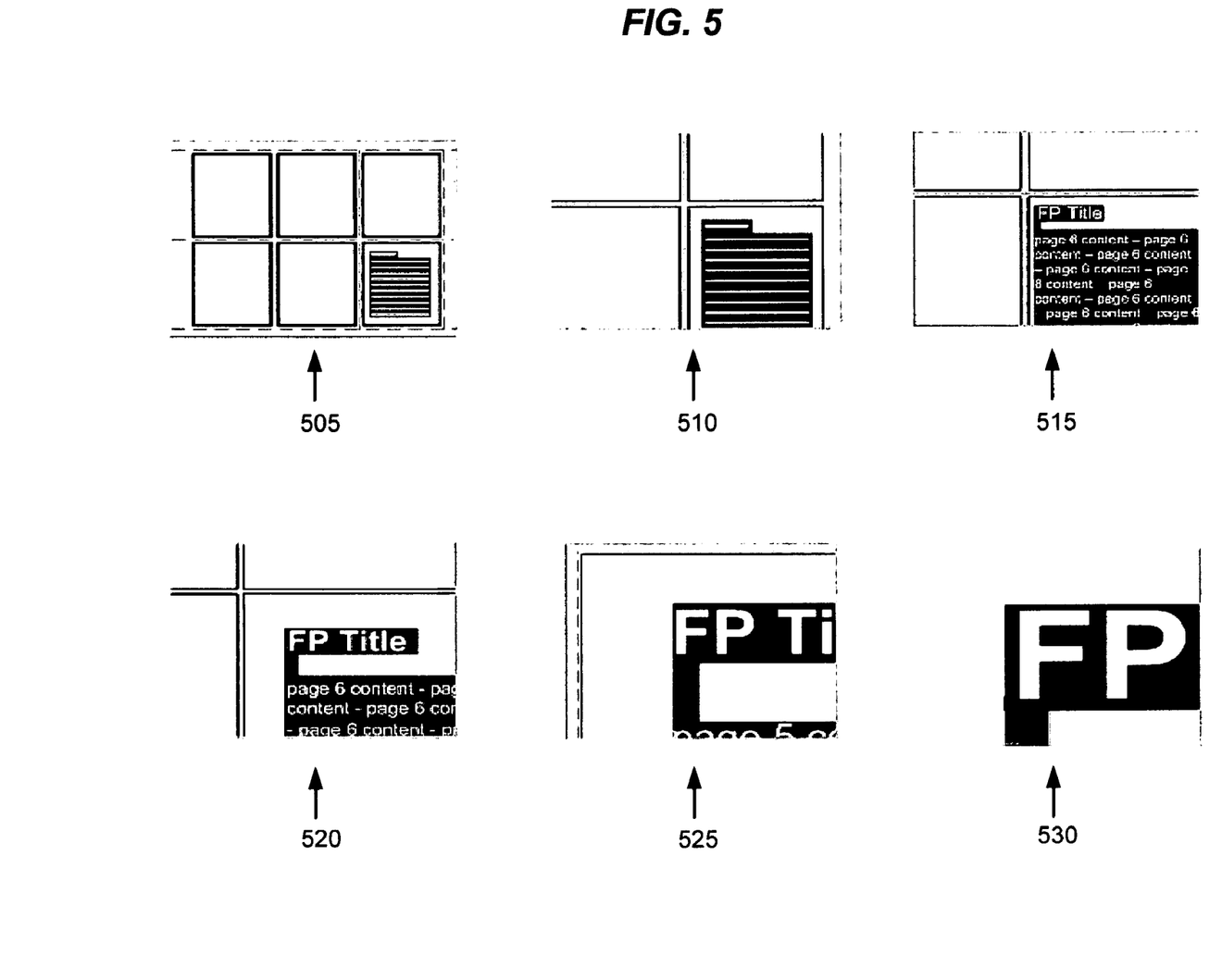
FIG. 5 illustrates several exemplary views of a viewing area of a document viewing control as the zoom increases in accordance with various aspects of the invention.

When zooming in, the focal point is centered in the window as much as possible while keeping the dead space around the page grid to a minimum. Dead space is border space around displayed pages in which no portion of the document is displayed. FIG. 5 illustrates several exemplary views of a viewing area of a document viewing control as the zoom increases in accordance with various aspects of the invention.

A view 505 shows the document displayed in a grid with one of the pages having an active selection. When the zoom is increased, since there is an active selection that is viewable, the beginning of this active selection is used as the focal point.

A view 510 shows the document when the zoom has increased. As the zoom increases, the focal point moves towards the center of the viewing area in a manner to avoid excessive dead space around the document in the viewing area. For example, in the view 510, the focal point is not yet at the center of the viewing area as to do so at this zoom level would introduce dead space at the right and possibly bottom of the viewing area.

At some time as the zoom increases, the focal point moves to the center of the viewing area. Thereafter, as the zoom continues to increase, the focal point remains in the center of the viewing area. This can be seen in views 515, 520, 525, and 530 as the zoom increases.

Figure 6:
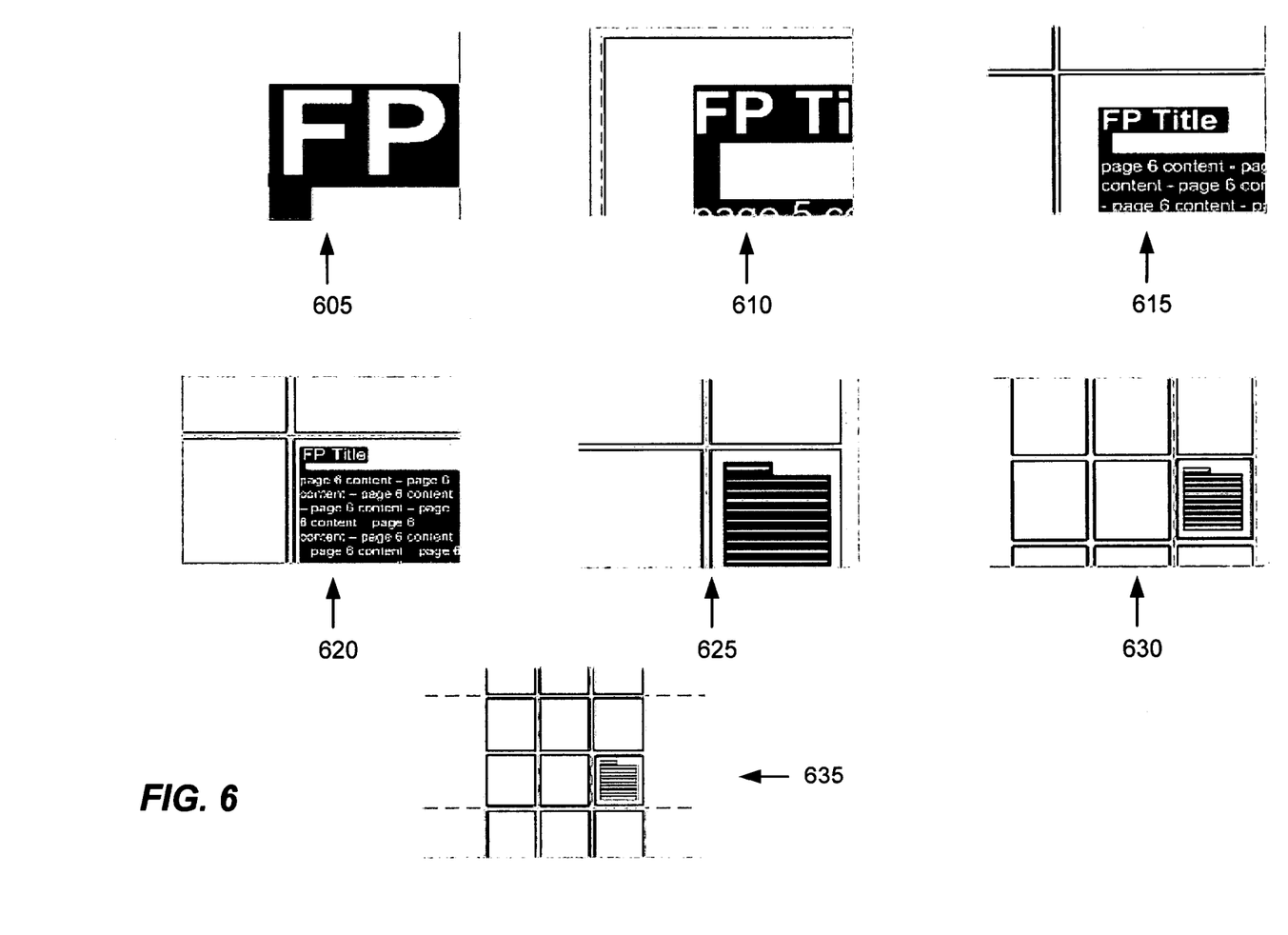
FIG. 6 illustrates several exemplary views of a viewing area of a document viewing control as the zoom decreases in accordance with various aspects of the invention.

FIG. 6 illustrates several exemplary views of a viewing area of a document viewing control as the zoom decreases in accordance with various aspects of the invention. At view 605, the document is displayed at one zoom. The zoom of the document subsequently decreases through views 610-635. When zooming out, the focal point may remain centered vertically within the viewing area but may move horizontally, depending in which page of the page grid the focal point is contained.

Zooming in and out with an IP is handled similarly to zooming in and out with an active selection. In this case, if the IP is in a page that is displayed in the viewing area, the IP becomes the focal point. After that point, displaying the document in response to changes in zoom proceeds as described previously.

Zooming in an out when neither an IP nor an active selection is displayed in the viewable area proceeds by using the center of the viewable area as the focal point and then displaying the document in response to changes in zoom as described previously.

It should be noted that changing the zoom does not change the layout of the page grid but may change the number of pages displayed. For example, if two rows of pages of a grid having two columns are originally displayed and zoom out is selected, the beginning of the third row of pages may be displayed, but no new columns are added.

Changing the zoom may change the content size of flow content to keep it in sync with the size of the page element, but it may not affect the flow of the content. Rather, an application may initiate a reflow of content on the pages.

When a request to change the number of grid columns is made, the page containing the IP may be placed in the first row of the page grid but may not necessarily be the first visible page. For example, if page 3 has the IP and the user asks for 3 grid columns, page 1 may be the first visible page but page 3 is still in the first row. If there is no IP (i.e., read only content), the first visible page may be used to determine the layout of the grid columns.

Additionally, when selecting a number of columns to display, the number of rows may not be needed since the number of rows in the page grid is based directly on the number of columns and the window size. For example, if the request is for 5 columns and the document has 15 pages, the zoom may be set to a percentage that allows a second row of 5 pages (or possibly a third) to be displayed.

Figure 7:
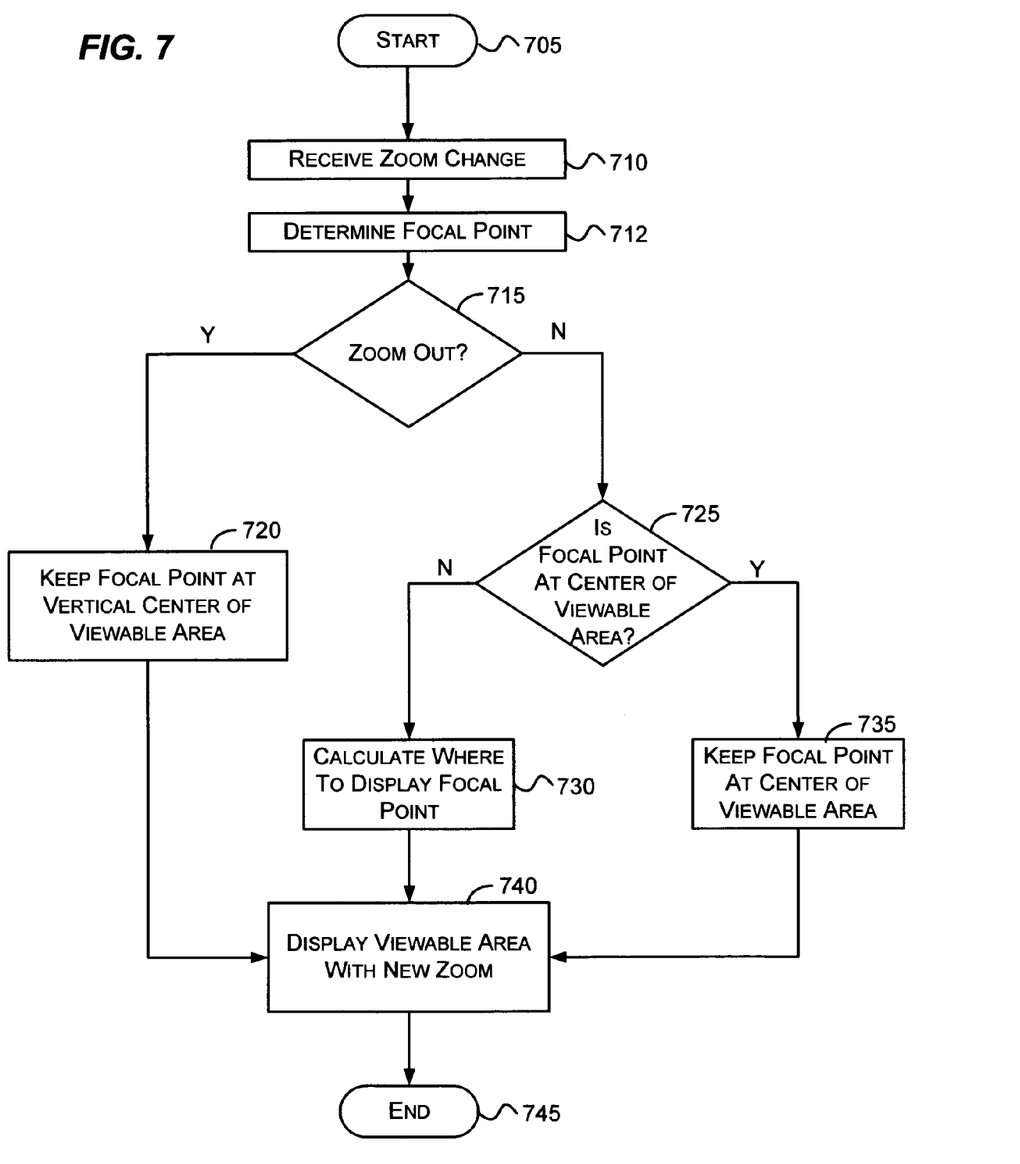
FIG. 7 is a flow diagram generally representing exemplary actions that may occur when changing the zoom in accordance with various aspects of the invention.

FIG. 7 is a flow diagram generally representing exemplary actions that may occur when changing the zoom in accordance with various aspects of the invention. At block 605, the actions begin.

At block 710, a zoom change is received. This may be received, for example, in response to a user selecting a button or a program calling an API or setting a property of the document viewing control.

At block 715, a determination is made as to whether the zoom change is a zoom out or a zoom in. If the zoom change is a zoom out, processing continues at block 720; otherwise, processing continues at block 725.

At block 720, because a goal when zooming out is to keep the focal point at the vertical center, the focal point is kept at the vertical center of the viewing area. The horizontal position at which the focal point is displayed may change to attempt to minimize dead space around the page that contains the focal point. For example, if the focal point is in the right edge of a grid of pages and originally the focal point is displayed at the center of the viewing area, the focal point may be displayed closer to the right edge of the viewing area with each subsequent zoom out. This is shown, for example, in conjunction with FIG. 6.

Block 725 is reached when zooming in. At block 725, a determination is made as to whether the focal point is already displayed at the center of the viewable area. If so, processing branches to block 735; otherwise, processing branches to block 730.

At block 730, a calculation is performed as to where to display the focal point. When zooming in, the focal point is displayed closer and closer to the center of the display area until it is displayed as the center of the display area. In subsequent zoom-ins, the focal remains displayed in the center of the viewable area. The calculation performed at block 730 determines where the focal point should be displayed so as to reduce or minimize dead space around the page including the focal point as described previously.

At block 735, the focal point is not moved in the viewing area when the document is displayed using the new zoom.

At block 740, the viewable area of the document is displayed in the viewing area in accordance with the new zoom. At block 745, the actions end. The actions described above may be repeated each time a zoom changes.

It will be recognized that aspects of the invention may be practiced with or without a document viewing control. For example, a standard word processor, spreadsheet, presentation application, web browser, operating system component, or other kind of document viewer may zoom in and out on a document as described above without having a document view control.

It will also be recognized that different zooming behaviors may be implemented for zooming in and out on a document without departing from the spirit or scope of the present invention. For example, when zooming in when no insertion point or active selection is viewable, the focal point may be set to the page having the most area displayed and that is closest to the center of the viewable area.

As can be seen from the foregoing detailed description, there is provided a method and system for zooming in an out of paginated content. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions for performing a method for changing the zoom of a document displayed in a viewing area, the method comprising:
    receiving a zoom change for a document displayed in the viewing area;
    determining whether the zoom change is a zoom out or a zoom in;
    determining a focal point for the document;
    when the zoom change is a zoom in, determining if the focal point is at the center of the viewing area;
    when the zoom change is a zoom in and the focal point is at the center of the viewing area, keeping the focal point at the center of the viewing area;
    when the zoom change is a zoom in and the focal point is not at the center of the viewing area, calculating a new position for the focal point; and
    displaying a viewable area of the document based on the focal point and the zoom change.

2. The computer-readable storage medium of claim 1, wherein the zoom change is received in response to a user selecting a zoom toolbar item.

3. The computer-readable storage medium of claim 1, wherein the zoom change is received in response to an application calling an application programming interface of a document view control.

4. The computer-readable storage medium of claim 1, wherein determining a focal point for the document comprises determining whether an insertion point is displayed in the viewing area, and if so, setting the focal point to the insertion point.

5. The computer-readable storage medium of claim 1, wherein determining a focal point for the document comprises determining whether any part of an active selection is displayed in the viewing area, and if so, setting the focal point to the beginning of the active selection.

6. The computer-readable storage medium of claim 1, wherein determining a focal point for the document comprises determining that neither an insertion point nor any part of an active selection is visible in the viewing area and setting the focal point to the center of the viewing area.

7. The computer-readable storage medium of claim 1, wherein displaying a viewable area of the document based on the focal point and the zoom change comprises calculating a location in the viewing area at which the focal point is displayed.

8. The computer-readable storage medium of claim 1, wherein calculating a location in the viewing area at which the focal point is displayed comprises determining a location in the viewing area which reduces dead space when the focal point is displayed at the location at the zoom change.

9. The computer-readable storage medium of claim 1, wherein calculating a location in the viewing area at which the focal point is displayed comprises determining that the location is in the center of the viewing area when no dead space is displayed when displaying the focal point at the location.

10. The computer-readable storage medium of claim 1, wherein calculating a location in the viewing area at which the focal point is displayed comprises determining that the location is centered vertically in the viewing area in response to a zoom change that is a zoom out.

11. A method for changing the zoom of a document displayed in a viewing area, the method comprising:
    receiving a zoom change for a document displayed in the viewing area;
    determining whether the zoom change is a zoom out or a zoom in;
    determining a focal point for the document;
    when the zoom change is a zoom in, determining if the focal point is at the center of the viewing area;
    when the zoom change is a zoom in and the focal point is at the center of the viewing area, keeping the focal point at the center of the viewing area;
    when the zoom change is a zoom in and the focal point is not at the center of the viewing area, calculating a new position for the focal point; and
    displaying a viewable area of the document based on the focal point and the zoom change.

12. The method of claim 11, wherein determining a focal point of the document comprises determining whether an insertion point is displayed before the instruction is received, and if so, setting the focal point to the insertion point.

13. The method of claim 11, wherein determining a focal point of the document comprises determining whether an active selection is displayed before the instruction is received, and if so, setting the focal point to a beginning, top, bottom, end, left, or right of the active selection.

14. The method of claim 11, wherein determining a focal point of the document comprises determining that neither an insertion point nor an active selection is displayed before the instruction is received.

15. The method of claim 14, further comprising setting the focal point to a point in the document corresponding to the center of the viewing area.

16. The method of claim 14, further comprising setting the focal point to a page in the document, wherein the page covers the largest area of any page displayed in the viewable area before the instruction is received.

17. An apparatus for viewing documents, comprising one or more computer processors, one or more computer-readable storage media and upon which is being performed the method of claim 11.

18. The apparatus of claim 17, wherein the focal point further determines where the part of the document is displayed in the viewing area.

19. The apparatus of claim 17, wherein the focal point comprises one of a point of an active selection, an insertion point, and a center of the viewing area.

20. The apparatus of claim 17, wherein the method includes instantiating a document viewing component comprising a control arranged to be instantiated by an application component.

* * * * *